United States Patent [19]
Mihailov et al.

[11] Patent Number: 5,706,375
[45] Date of Patent: Jan. 6, 1998

[54] VARIABLE-ATTENUATION TUNABLE OPTICAL ROUTER

[75] Inventors: Stephen J. Mihailov, Ottawa; Mark Farries, Nepean Ontario; Jinghui Li, Ontario; Koichi Abé, Ottawa; Gary S. Duck, Nepean, all of Canada

[73] Assignee: JDS Fitel Inc., Nepean, Canada

[21] Appl. No.: 711,978

[22] Filed: Sep. 10, 1996

[51] Int. Cl.$^6$ ................................... G02B 6/28
[52] U.S. Cl. ................ 385/24; 385/37; 250/227.18
[58] Field of Search ........................ 385/37, 24, 12, 385/13; 250/227.14, 227.18

[56] References Cited

U.S. PATENT DOCUMENTS

| | | | |
|---|---|---|---|
| 5,401,956 | 3/1995 | Dunphy et al. | 250/227.18 |
| 5,446,809 | 8/1995 | Fritz et al. | 385/17 |
| 5,557,442 | 9/1996 | Huber | 385/37 |

OTHER PUBLICATIONS

Programmable fiber grating based wavelength demultiplexer; L. Quetel; L. Rivoallan, E. Delevaque; H. Poignant; M. Monerie; T. Georges; France Telecom; CNET Lab/Rio/Tso, Technopole Anticipa. Lannion 22307 France. OFC '96 Technical Digest.

Primary Examiner—John Ngo
Attorney, Agent, or Firm—Neil Teitelbaum & Associates

[57] ABSTRACT

A device for distributing an optical signal has an optical waveguide with a plurality of gratings disposed in series therein, the gratings having a predetermined reflectivity response within a specific wavelength range; an optical circulator having at least three ports, one of the ports serving as an input port for receiving the optical signal, and another port for removing at least a part of the optical signal reflected from one of the gratings; and control means for individually controlling at least some of the gratings to effect a change of the wavelength range of the reflectivity response of the gratings. The change may be a shift, an expansion or a compression of the range. The device can function as a signal distributor (router), an equalizer or a demultiplexer. The reflectivity response is preferably a sloped response.

18 Claims, 5 Drawing Sheets

VARIABLE-ATTENUATION TUNABLE OPTICAL ROUTER

FIELD OF THE INVENTION

This invention relates to tunable optical signal routers or demultiplexers and particularly to tunable optical signal routers or demultiplexers based on waveguide gratings, for example Bragg gratings.

BACKGROUND OF THE INVENTION

Bragg filters, known also as Bragg gratings, are gaining popularity. One type of a Bragg filter, which has been developed for sensing stress and/or temperature changes in structures is incorporated or embedded in the core of an optical fiber by a method disclosed, for instance, in U.S. Pat. No. 4,807,850. As discussed in this patent, permanent periodic gratings of this kind can be provided or impressed in the core of an optical fibre by exposing the core through the cladding to the interference pattern of two coherent beams of ultraviolet light that are directed against the optical fibre symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating. The embedded grating of this kind reflects the light launched into the fiber core for guided propagation therein in a propagation direction. Only the light having a wavelength within a very narrow range dependent on the grating element periodicity is reflected back along the fibre axis opposite to the original propagation direction, while the grating is substantially transparent to light at wavelengths outside the aforementioned narrow band so that it does not adversely affect the further propagation of such other light. In effect, this type of grating creates a narrow notch in the transmission spectrum, and by the same token a similarly narrow peak in the reflection spectrum. In the applications for which this kind of Bragg filter has been developed, any stresses or temperature changes encountered at the location of the structure in which the Bragg filter is embedded affect the grating and change its periodicity, or the index of refraction of the material of the core, or both so that the position of the central wavelength in the spectrum is shifted, thus providing an indication of the stress or temperature changes existing or taking place in the structure being monitored at the location of the grating.

Further development in this area is disclosed in U.S. Pat. No. 5,007,705. In the '705 patent, various means are disclosed for intentionally shifting the reflection wavelength response of a Bragg grating. By deliberately varying the period of the grating or altering the index of refraction in a predetermined manner (for example, appodizing) using controlled external forces or actions on the fibre section containing the grating, a tunable (variable) light filtering element is provided. It is known to tune a grating by various means such as the application of heat, compression, bending (uniform or non-uniform) or stretching. It is known that uniform stretching shifts the wavelength response of the grating.

An application of the principles described heretofore can be found in U.S. Pat. No. 5,446,809 to Fritz et al., which discloses an optical fiber wavelength selective optical switch utilizing tunable Bragg fibre gratings. The fiber wavelength selective switch has one or more 1 X N input optical couplers and utilizes a plurality of in-line Bragg fiber gratings in series along multiple parallel paths. For a given wavelength of light to pass through a particular grating, the grating must be detuned. By providing a plurality of Bragg gratings in series, each designed to reflect a different wavelength, and having means for controlling or shifting the response of each grating individually, signals can selectively be passed through a fibre or can be reflected backwards in a binary on-off fashion.

Although the prior art describes a plurality of modes and means for varying the output response of a Bragg grating within an optical fibre, there remains a need for useful application of this technology that provides a non-binary response. For example, there remains a need for a variable demultiplexer/attenuator that utilizes Bragg grating technology for selectively routing signals which are modified in a non-binary fashion.

SUMMARY OF THE INVENTION

It is an object of the invention to provide a tunable demultiplexer.

It is another object of the invention to provide a tunable demultiplexer with attenuating capability.

It is still another object of the invention to provide a device for distributing, or routing, and optionally attenuating light bands of selected wavelengths, using an optical waveguide system, with the capability for adding and removing selected bands of light to or from the system.

In accordance with the invention, there is provided a device for distributing an optical signal or a plurality of optical signals, the device comprising:

an optical waveguide section having at least one plurality of grating elements or gratings disposed therein in series, the grating elements or gratings having a predetermined normal, or initial, reflectivity response characteristics within a specific wavelength range, an optical circulator for inputting into the optical waveguide an optical signal having at least one distinct band of light in a predetermined wavelength range, means for individually controlling the grating elements to modify the wavelength response of the elements, such as to cause the elements to partly reflect and partly transmit the optical signal thereby converting it into a plurality of distinct optical bands, channeling means coupled with the optical waveguide for selectively channelling at least one of the distinct light bands out of the waveguide.

In an embodiment of the invention, at least some of the plurality of the grating elements or gratings have a sloped reflectivity response within a predetermined wavelength range.

The means for controlling the grating elements are selected to effect at least one of the following control functions:

extend a grating to effect a shift of the reflectivity response in one direction on a wavelength scale, compress a grating to effect a shift of the reflectivity response in an opposite direction on the wavelength scale, chirp a grating to broaden the range of the response on the wavelength scale.

In an embodiment of the invention, the grating elements are Bragg grating elements or Bragg gratings. For simplicity, the term "grating" will be used hereinafter to denote both gratings and grating elements.

The sloped reflectivity response may be determined at least in part by refractive index variations of the grating elements or gratings. It may also be affected by controlled stretching, compressing, or temperature changes of the gratings or grating elements.

Chirping, i.e. a variation of the periodicity of the different refractive-index regions of a grating, may be imposed by the manufacturing process or may be obtained by the use of certain control means such as non-uniform stretching or compressing of a grating.

The means for inputting an optical signal and for selectively channelling light bands may be an optical circulator or a plurality of optical circulators. A plurality of such means may be coupled on the waveguide in various combinations with the serial gratings such as to selectively transmit input signals into the waveguide or extract processed signals therefrom.

BRIEF DESCRIPTION OF THE DRAWINGS

Exemplary embodiments of the invention will now be explained in more detail by way of the following description to be taken in conjunction with the drawings in which.

DETAILED DESCRIPTION OF THE INVENTION

It will be understood that, for the purpose of the invention, the term "sloped" (response) does not necessarily define a rectilinear profile; instead, it merely denotes a profile where the reflectivity response as a function of wavelength is higher on one side and lower on the other side of the wavelength coordinate. Such slope may have a parabolic, hyperbolic or irregular shape defined e.g. by corresponding variations in the refractive index gradient of the Bragg gratings.

Figure 1:
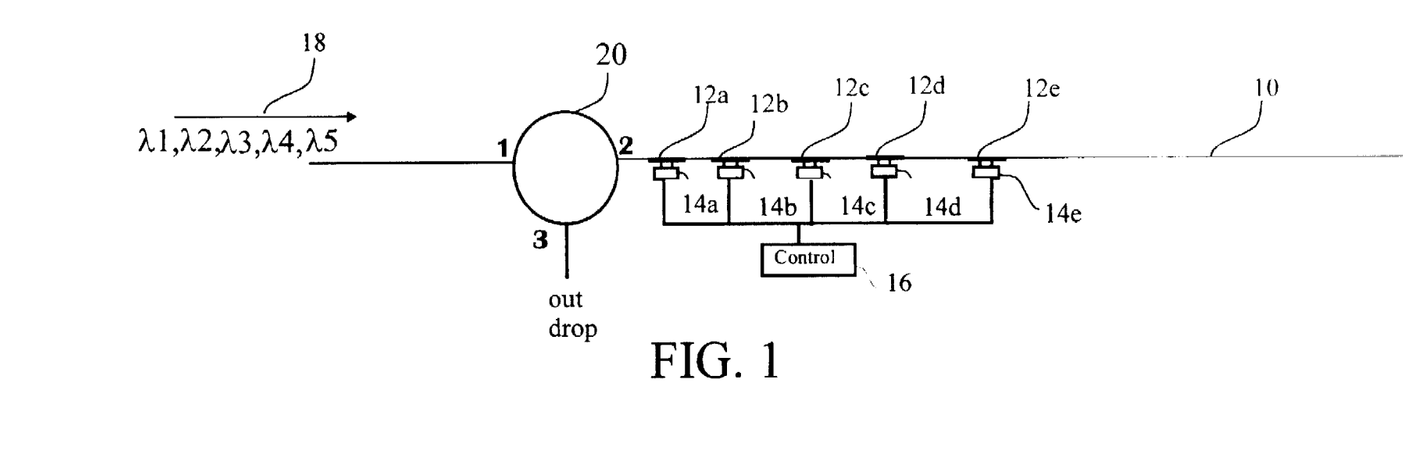
FIG. 1 shows a schematic diagram of an embodiment of the demultiplexer of the invention, with one optical circulator.

Turning now to FIG. 1, a circuit is shown having an optical waveguide exemplified by an optical fiber line 10. A number (five) of Bragg gratings 12a, 12b, 12c, 12d and 12e is shown in series written into the optical fiber 10. Tuning means, exemplified in this embodiment by individually controllable piezo-electric transducers 14a, 14b, 14c, 14d and 14e, are coupled to the respective gratings each for changing the period of the respective grating in dependence upon a control signal, not illustrated. A tuning control circuit 16 is coupled to each of the transducers and it can be preprogrammed or programmed in real-time for issuing appropriate control signals to the transducers. An input multiplexed optical beam 18 comprising a number of light bands of wavelengths (channels) $\lambda 1$, $\lambda 2$, $\lambda 3$, $\lambda 4$ and $\lambda 5$ is shown on the left side of the waveguide 10. The beam is passed through an optical circulator 20 having three ports 1, 2 and 3.

Each of the Bragg gratings 12a–12e is designed to have a different period, and consequently to affect a different channel. At least some of the gratings (all of them in the embodiment illustrated herein) have a sloped reflectivity response as illustrated in FIG. 3b. This is due to the fact that the refractive index difference $\Delta n$ between adjacent regions within each of the gratings varies along the length of the grating so as to provide a correspondingly varied reflectivity response over a predetermined wavelength range. Of course, other methods of forming reflective/transmissive elements having a variable reflectively response can be envisaged.

Figure 3A:
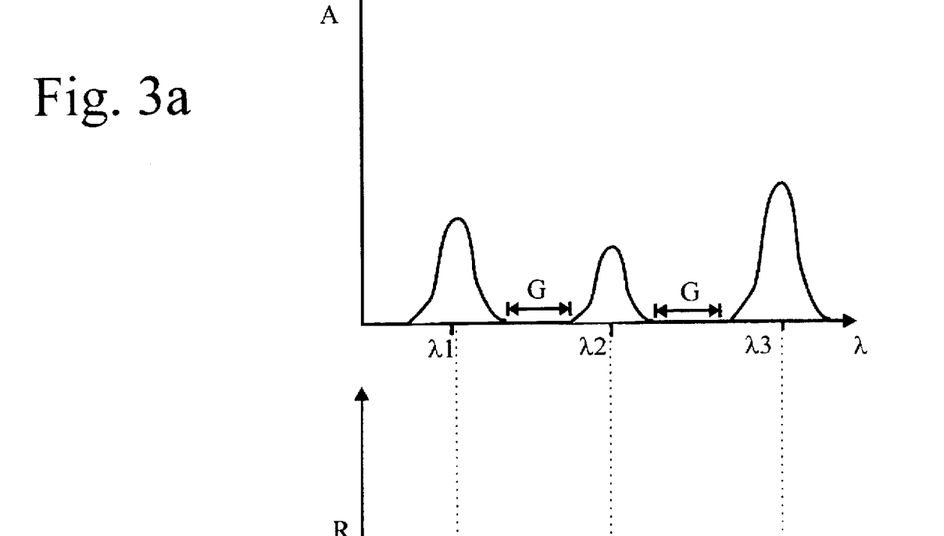
FIGS. 3a is a graph showing the amplitude wavelength response of three optical signals transmitted into the multichannel equalizer in an unequalized form, prior to being attenuated.
Figure 3B:
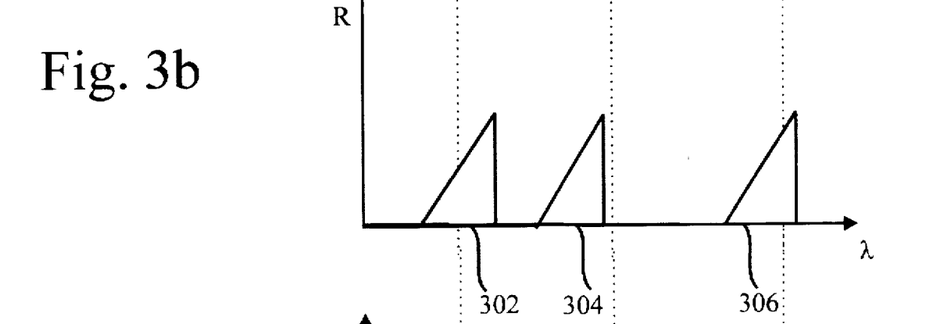
FIG. 3b is a graph showing the reflectivity wavelength response of three Bragg gratings corresponding to the circuit of FIG. 2, the first grating being in a stretched state with the corresponding wavelength shifted, the second grating being unstretched and the wavelength not shifted, and the third grating being stretched and wavelength shifted to achieve substantial attenuation of a particular wavelength of light.
Figure 3C:
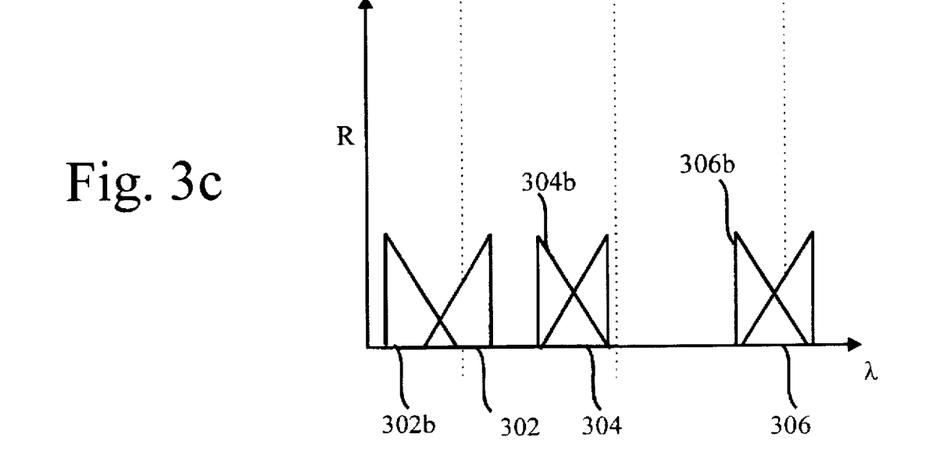
FIG. 3c is a graph showing the reflectivity wavelength response of three couplets of Bragg gratings.

The gratings may also be chirped to extend the reflectivity response (extend the base of the triangles of FIGS. 3b and 3c).

As indicated hereinabove, chirped gratings can be manufactured. One way of fabricating such gratings is to use a linear phase mask. Alternatively, when exposing the fibre to the laser radiation, an amplitude mask can be utilized so that one side of the grating is exposed more so than the other, resulting in a periodicity that varies both in refractive index and in distance, providing a chirped grating having a variable refractive index gradient (appodized grating). The effective $\Delta n$ can also be varied, to give rise to the sloped reflectivity response, by varying the width of $\Delta n$ sections.

Another way of providing a sloped reflectivity response is by using a very short hydrogen loaded grating, for example one having a 2 nm bandwidth. By tuning or wavelength shifting these gratings in a known manner, a variable reflectivity response and consequently a variable amount of attenuation is provided. Another means of achieving a chirp in a grating is by stretching or bending a uniform grating (having a uniform period) in a non-uniform manner, e.g. using a linearly-variable piezo-electric tuner or a non-circular bending template. By doing so, the period of the grating is changed in such a manner as to vary it along its length, thereby chirping the grating. The advantage of such a scheme is as follows: a substantially long grating with a uniform period typically has a very narrow reflectivity response; thus, when the grating is unbent, it can be hidden or stored between adjacent channels, essentially "tucked away".

The importance of such a possibility is explained herein below in the context of stringent standards of the telecommunications industry.

In the instance where an adjacent channel or wavelength range is to be attenuated, the grating can be bent in a non-uniform manner and thereby chirped so that range of reflectivity broadens, in a manner similar to an opening curtain. Of course, stretching or compressing the grating is effective to shift the wavelength range correspondingly. Thus the grating response can be compressed, expanded, and/or shifted.

Figure 2:
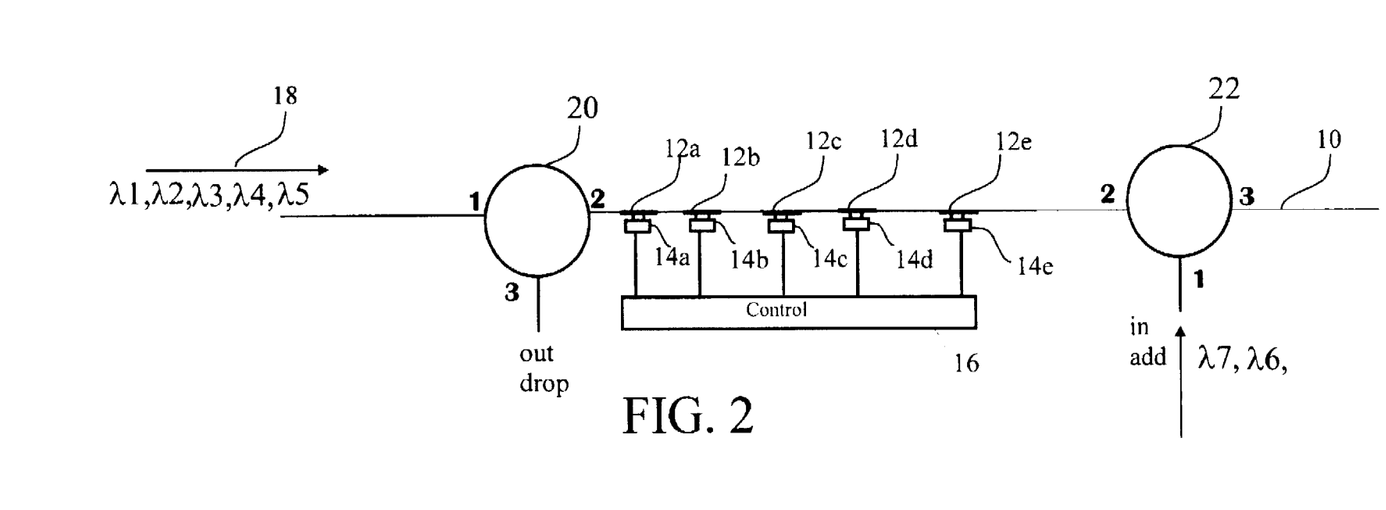
FIG. 2 is a schematic diagram of an embodiment of a demultiplexer and multiplexer, having two optical circulators.

FIG. 2 illustrates an alternative embodiment of the invention having two optical circulators 20, 22. The multiplexed optical beam 18 is fed into the waveguide 10 through the circulator 20 and passes through the waveguide 10. It is then modified according to the setting of the respective gratings as will be explained hereinbelow. Optionally, a part of the beam 18 reaches the second circulator 22 and is either transmitted therethrough down the fiber 10 in the same direction (right hand in FIG. 2) or removed through the port 1 of the circulator 22. Simultaneously, a second optical beam 24 comprising two signals $\lambda 6$, $\lambda 7$ may be added through the port 1 of circulator 22 and passed through the gratings 12e–12a along the fiber 10. The transmitted part of the second beam 24 may either be transmitted through the port 1 of the circulator 20 or removed through the port 3 thereof.

It will be appreciated that the device and the circuit in accordance with the invention may comprise more than two optical circulators or analogous means for channelling or routing light bands in dependence upon their wavelength, with a plurality of gratings or grating elements between two sequential circulators. The operation of such system will be explained hereinbelow.

FIGS. 3a–3c illustrate the effect of the sloped reflectivity response of the gratings on an optical signal. FIG. 3a shows a number of signals (channels) of different wavelength and having a different amplitude (intensity) A. Standards and specifications of the telecommunications industry dictate the minimum acceptable channel spacing between two transmission channels. In some instances the spacing, labelled G on FIG. 3a is relatively small. As illustrated in FIG. 3b, a selected sloped reflectivity response can be imparted to a grating, e.g. Bragg grating, the response which lies conveniently within this space G in one mode of operation and that can be shifted to coincide partly or fully with the wavelength or channel of interest ($\lambda 1$ or $\lambda 2$ or $\lambda 3$) in a variable manner so as to attenuate a particular channel by predetermined amount.

It will be understood that the term "attenuation" in the context of Bragg gratings has a specific meaning. A part of the signal e.g. $\lambda 1$ of FIG. 3a that is affected by the overlapping portion of the triangular reponse profile 302 of FIG. 3b will be reflected back in the opposite direction relative to the input direction; the remaining part of the signal $\lambda 1$ will be unaffected by the profile 302 and will be transmitted in a normal manner. No significant loss nor absorption of the signal takes place.

As explained, the reflectivity response profiles, shown as triangular shapes for simplicity only in FIG. 3b, can be modified by known means such as stretching, compressing or bending of the optical waveguide. Stretching is used in the embodiments illustrated in FIGS. 1 and 2. By providing predetermined control signals through the control circuit 16, the range of reflectivity (the bases of the triangles 302, 304 and 306) which may normally be "tucked away" without affecting the signals can be shifted towards the wavelength range, i.e. the signal, to be modified.

FIG. 3c illustrates the reflectivity response of an embodiment where grating couplets 302, 302a; 304, 304b and 306, 306b are provided, each grating of such couplet being tunable over substantially the same range, and wherein the couplet can share a same space G for convenient storage when no attenuation is required.

In another embodiment, not illustrated, the grating control means are compressive actuation means which are coupled to each grating, or each other grating; in this arrangement one grating of a couplet can be used to attenuate an adjacent higher wavelength, while the other grating of a couplet can be utilized to attenuate an adjacent lower wavelength signal, by stretching some gratings and compressing the other gratings a predetermined amount. It should be noted that although the gratings shown are preferably impressed within an optical fibre, other optical waveguide structures can conveniently be utilized; for example a plurality of gratings can be written into a slab waveguide wherein heating elements can be used to control the wavelength reflectivity response of the gratings.

Figure 4:
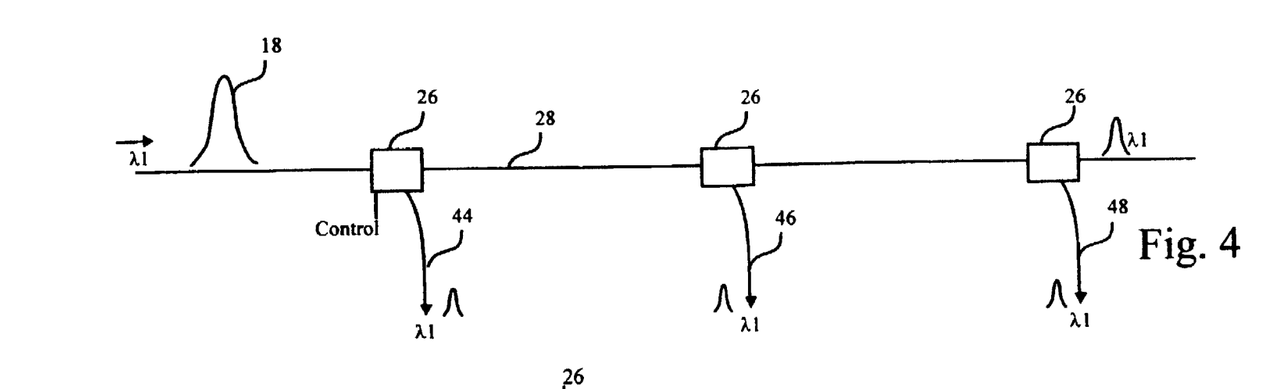
FIG. 4 is a schematic block diagram of the demultiplexer operating in an add-and-drop mode.
Figure 5:
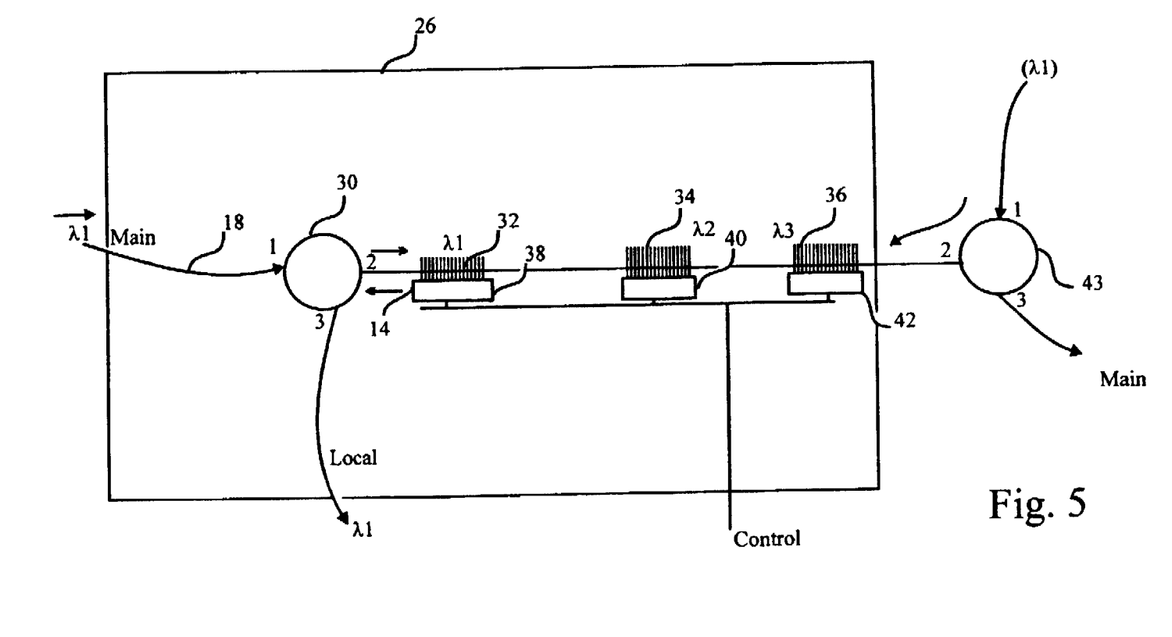
FIG. 5 is a schematic diagram of a modified embodiment of FIG. 4, illustrating the device of FIG. 4 in more detail; and, FIG. 6 is a schematic diagram of an other embodiment of an add-and-drop circuit in accordance with this invention.

FIG. 4 illustrates an embodiment of the invention operable as a distributing, or routing system. A number of units 26 is disposed in series on a waveguide 28, an exemplary unit 26 being shown in more detail in FIG. 5 within the rectangular frame. A signal 18 is fed into the waveguide 28 and passed through one or more units 26. As shown in FIG. 5, each unit 26 has an optical circulator 30 with ports 1, 2 and 3 (a circulator with a different number of ports may be used), and a number of Bragg gratings 32, 34 and 36, the gratings (or some of them) having a sloped reflectivity response as a function of wavelength. Further, means for controlling the response, e.g. piezo-electric tuners 38, 40, 42 are coupled to the gratings respectively. A control circuit 44 provides control signal to each of the tuners 38, 40, 42.

The embodiment of FIG. 5 further has an optical circulator 43 which serves to input another signal $\lambda 2$ for passing in a direction (left) opposite to that of the signal 18 and, optionally, to remove a part of the signal 18 that is transmitted through all the units 26.

Thus, the two 3-port optical circulators 30 and 43 are interconnected via their second ports by an optical fibre having three Bragg grating elements within the optical fibre, a first of the gratings 32 being tunable to fully transmit, fully reflect or partially transmit and reflect light of wavelength $\lambda 1$. A second and third of the gratings 34 and 36 respectively are independently tunable in a same manner, to reflect, transmit, or reflect/transmit light of wavelength $\lambda 1$ and $\lambda 2$.

The operation of the embodiment of FIG. 2 is similar to that of FIG. 1, with the additional possibility of adding another signal from the opposite side relative to the first signal and of removing the reflected part of the signal on either side of the waveguide.

The embodiment of FIG. 4 is operable either as an equalizer or as a signal router, or demultiplexer, by virtue of the units 26 functioning as non-binary attenuators wherein a part of the particular wavelength is reflected (in dependence on the slope 302 being placed or shifted to overlapp the signal band) and routed out of the system, say to a first user, through a local output line 44, while the remaining part of the signal is passed on to another unit 26 with the operation being repeated there accordingly, parts of the signal being routed to users through local output lines 46 and 48 respectively.

The gratings 32, 34, 36 have all preferably a sloped reflectivity response as explained hereinabove.

The embodiment of FIG. 4 may also operate as a signal distributor if a beam having a single wavelength is inputted into the waveguide of FIG. 4, and the gratings 32, 34 and 36 are selected and tuned to attenuate that wavelength.

To summarize, the device of the invention can operate as a router, equalizer or a demultiplexer. In the equalizer mode, explained on FIG. 1, the particular bands $\lambda 1$, $\lambda 2$, $\lambda 3$, $\lambda 4$ and $\lambda 5$ of the signal 18 (each of the bands being of a different intensity) become separately attenuated by means of respective tuning of the sloped reflectivity profile of the respective Bragg gratings 12a–12e, as illustrated in FIGS. 3a and 3b. The reflected ("cut-off") part of each band is of course reflected back towards the optical circulator 20 and removed through the port 3. The attenuation is controlled so that the transmitted portion of the respective signals is of a similar intensity, or amplitude. Preferably, all the gratings have a sloped reflectivity profile to facilitate an adequate overlap of the wavelength ranges, of the gratings and the bands respectively.

In the demultiplexer mode, the reflectivity response profile of the gratings may be either sloped or regular (no variation of Δn gradients), and the wavelength characteristics of the gratings is selected such that one of the bands, e.g. λ1 of the signal 18 is reflected by one or more of the gratings and returned to the circulator 20 while the other bands are transmitted along the waveguide 10 to another receiver.

The operation in a router mode has been explained in conjunction with FIG. 4 and FIG. 5.

It will be appreciated that in this mode, the device can distribute a part of a single-wavelength signal to various local users, or to demultiplex single wavelengths from a multiplexed beam and to distribute them, optionally equalized, to various receivers.

Figure 6:
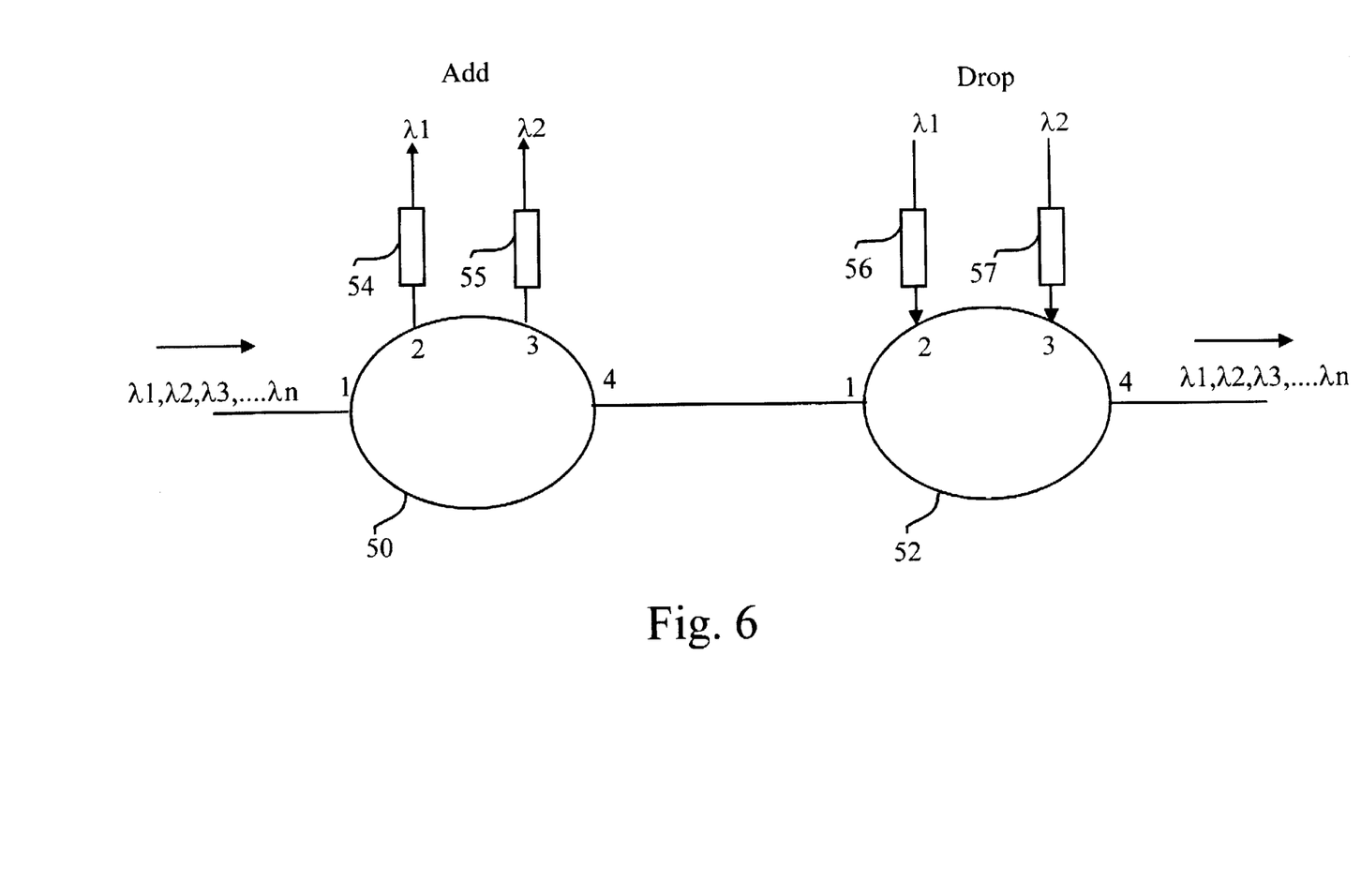

Referring now to FIG. 6 an add-drop circuit is shown wherein first and second multi-port circulators 50 and 52 are coupled to one another through their ports 4 and 1 respectively for providing the function of dropping or adding particular wavelengths or channels λ1, λ2, λ3, ... λn. The circuit for example illustrates the removal (dropping) of channels λ1, and λ2 and the insertion (adding) a different channels λ1, and λ2, however other channels from λ1, λ2, λ3, ... λn could be dropped from ports 2 and 3 of circulator 50 and/or added to ports 2 and 3 of circulator 52. Along the optical path extending from ports 2 and 3 of 50 are tunable Bragg gratings 54 and 55; and along the optical path extending from ports 2 and 3 of 52 are tunable Bragg gratings 56 and 57. For convenience the gratings are shown to be within a single housing, however gratings 54, 55, 56, and 57 are identical and are each comprised of individually tunable gratings normally reflecting wavelengths channels λ1, λ2, λ3, ... λn, and tunable to allow one or more of wavelengths channels λ1, λ2, λ3, ... λn to pass. Thus in the exemplary embodiment shown in FIG. 6, gratings 54 and 56 are tuned to pass channel λ1 and to reflect channels or wavelengths λ2, λ3, ... λn. Gratings 55 and 57 are tuned to pass channel λ2 and to reflect channels or wavelengths channels λ1, λ3, ... λn thereby providing a tunable add-drop circuit for adding on two separate inputs any of channels λ1 λ2, λ3, ... λn and for dropping on two separate outputs channels λ1 λ2, λ3, ... λn. Of course 5 or more port circulators can be utilized for adding or dropping different channels on a greater number of separate paths.

Figure 7:
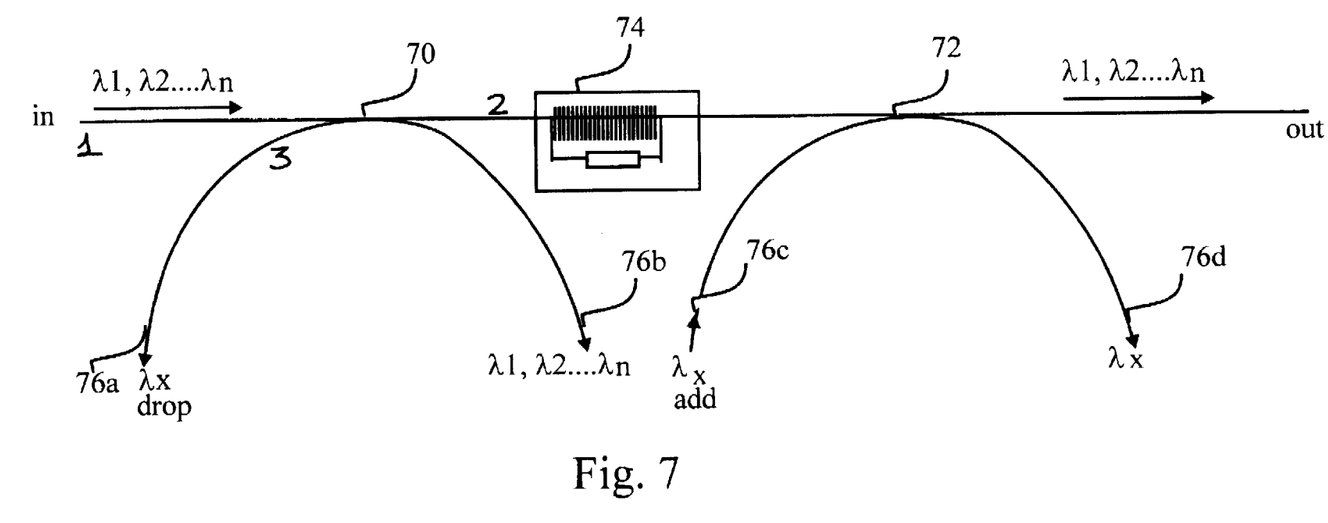

FIG. 7 shows yet a different embodiment wherein directional optical couplers 70 and 72 (function as rudimentary circulating means effectively providing ports 1, 2, and 3, and) are used for coupling add and drop ports 76a and 76c to the main in/out path shown. A tunable Bragg filter means 74 is controllable to selectably reflect one of wavelengths channels λ1 λ2, λ3, ... λn backwards to be dropped and to reflect an added channel to the out path. Of course approximately 50% of the added and dropped channel is lost out of ports 76b and 76d using this type of coupler. Of course amplification could be used to compensate for the inherent loss associated with this design.

Numerous other embodiments may be envisaged without departing from the spirit and scope of the invention.

What we claim is:

1. A device for distributing an optical signal, comprising:
   an optical waveguide having a plurality of gratings disposed in series in said waveguide, said gratings having a predetermined reflectivity response within a specific wavelength range;
   an optical circulating means having at least three ports, one of the at least three ports serving as an input port for receiving the optical signal, another of the at least three ports coupled to the optical waveguide and a third port for removing at least a part of the optical signal reflected from one of the gratings; and,
   control means for individually controlling said at least some of said gratings to effect a change of the wavelength range of said reflectivity response of the gratings, said change being one of an expansion of said range and a compression of said range.

2. The device of claim 1 wherein at least one of said gratings has a sloped reflectivity response within a specific wavelength range wherein one end of said grating is more reflective than another end thereof.

3. The device of claim 1 wherein said gratings are grating couplets.

4. The device of claim 2 wherein sloped reflectivity response is determined by refractive index gradient variations along the length of said at least one of said gratings.

5. The device of claim 1 further having at least one additional optical circulating means disposed between two adjacent gratings in the optical waveguide, for removing another part of the optical signal reflected from one of the gratings, and optional adding of another optical signal.

6. The device of claim 1 wherein said control means are means for effecting an expansion of said wavelength range of at least some of said gratings.

7. The device of claim 6 wherein said control means are means for imparting chirping to said gratings.

8. The device of claim 6 wherein said specific wavelength range of at least some of said gratings at one position is outside said predetermined wavelength range of said at least part of said optical signal and said expansion of said wavelength range is such as to cause said specific wavelength range of said response to partly overlap with said wavelength range of said optical signal.

9. The device of claim 1 wherein said control means are means for non-uniform bending of said grating.

10. The device of claim 1 wherein a plurality of optical circulators is disposed on said waveguide, each of said circulators having at least three ports, at least one Bragg grating being disposed between each two adjacent optical circulators, and wherein said control means are means for modifying said wavelength response of said at least one Bragg grating to cause said grating to partly reflect and partly transmit said optical signal thus creating a plurality of partial signals,
   wherein said circulators are adapted each to channel one of said plurality of partial signals out of said waveguide.

11. The device of claim 9 wherein said reflectivity response of said at least one Bragg grating is a sloped response wherein one end of said grating is more reflective than another end thereof.

12. The device of claim 6 wherein said specific wavelength range of at least some of said gratings at one position is outside said predetermined wavelength range of said at least part of said optical signal and said expansion of said wavelength range is such as to cause said specific wavelength range of said response to fully overlap with said wavelength range of said optical signal.

13. A device for distributing an optical signal, comprising:
   an optical waveguide having at least a grating disposed therein, said grating having a predetermined reflectivity response within a specific wavelength range;

an optical coupling means having a port coupled to the optical waveguide for removing light of a specific wavelength range; and, control means for controlling said at least a grating to effect a change of the wavelength range of said reflectivity response of the grating, said change being one of an expansion of said range and a compression of said range of the at least a grating.

14. A method of distributing optical signals in an optical system comprising the steps of:
 a) providing an optical waveguide having a plurality of gratings disposed in series in said waveguide, said gratings having a predetermined reflectivity response within a specific wavelength range;

launching an optical signal comprising wavelengths corresponding to a plurality of spaced optical channels into the waveguide.

providing a means of coupling reflected light from the waveguide;

tuning the gratings by individually controlling said at least some of said gratings to effect a change of the wavelength range of said reflectivity response of the gratings, said change being one of an expansion of said range and a compression of said range.

15. A method as defined in claim 14, wherein the tuning of said gratings effects a compression of the range of the reflectivity response of one of the gratings so that its reflectivity response is substantially hidden in a space corresponding to a wavelength range, between adjacent channels.

16. A method as defined in claim 14, wherein the tuning of said gratings effects an expansion of the range of the reflectivity response of a grating so that the reflectivity response is substantially broadened to reflect a greater range of wavelengths.

17. A method as defined in claim 14, wherein the wavelength response of the grating is substantially sloped.

18. A method as defined in claim 15, wherein the wavelength response of the grating is substantially sloped.

* * * * *